US009741031B2

(12) United States Patent
Pandey

(10) Patent No.: US 9,741,031 B2
(45) Date of Patent: Aug. 22, 2017

(54) PORTABLE DEVICE CONFIGURED TO RECEIVE PRODUCT INFORMATION

(75) Inventor: Siddharth Pandey, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1931 days.

(21) Appl. No.: 12/333,046

(22) Filed: Dec. 11, 2008

(65) Prior Publication Data

US 2010/0153222 A1 Jun. 17, 2010

(51) Int. Cl.
*G06Q 20/32* (2012.01)
*G06Q 20/20* (2012.01)

(52) U.S. Cl.
CPC ....... *G06Q 20/3276* (2013.01); *G06Q 20/204* (2013.01); *G06Q 20/32* (2013.01); *G06Q 20/322* (2013.01); *G06Q 20/3278* (2013.01)

(58) Field of Classification Search
USPC ......................................... 707/101
See application file for complete search history.

(56) References Cited

U.S. PATENT DOCUMENTS

| 7,797,176 | B2* | 9/2010 | Miyashita | 705/5 |
|---|---|---|---|---|
| 2006/0200480 | A1* | 9/2006 | Harris et al. | 707/101 |
| 2007/0124213 | A1* | 5/2007 | Esau et al. | 705/26 |
| 2008/0091552 | A1* | 4/2008 | Aas | 705/26 |
| 2011/0131109 | A1* | 6/2011 | Pappas et al. | 705/26.1 |

* cited by examiner

*Primary Examiner* — Ryan Zeender
*Assistant Examiner* — Denisse Ortiz Roman

(57) ABSTRACT

A portable device includes a data capture unit and a wireless communication circuit in communication with a control circuit. The data capture unit is configured to receive product information from a product identifier. The wireless communication circuit is configured to communicate with a vendor server storing an electronic catalog that includes a product associated with the product information.

20 Claims, 4 Drawing Sheets

PORTABLE DEVICE CONFIGURED TO RECEIVE PRODUCT INFORMATION

BACKGROUND INFORMATION

Advancements in technology and a competitive market have motivated manufacturers of portable devices, such as cell phones or personal digital assistants (PDAs), to include features that make the portable device more attractive to consumers. Often times, the additional features are unrelated to the portable device's primary purpose, and instead, are there to provide convenience to consumers. For example, many cell phones have an embedded digital camera, a calculator, or other peripheral features.

However, these additional features have yet to improve a consumer's experience while shopping at a retailer, such as a grocery or department store. Specifically, portable devices currently provide the consumer with a limited ability to research and purchase products while shopping at a store. Accordingly, a portable device is needed that allows a consumer to research and purchase items while shopping at a retailer.

DETAILED DESCRIPTION

A system includes a portable device that allows a consumer to research and/or purchase products by scanning product identifiers located on various products. For example, as the consumer is shopping in a store, the consumer may scan various products with the portable device and receive additional product information about the various products scanned, including specifications, reviews, accessories, or other information that may help the consumer determine whether the purchase the product. Then, the consumer may place the products in a shopping cart, authorize payment of the products to a credit card, and exit the store with the products. Alternatively, the consumer may be shopping for products that are too large or cumbersome for the consumer to carry or transport. Therefore, the consumer may scan the product with the portable device and authorize purchase and shipment of the product to the consumer's home or another address. In yet another embodiment, the consumer may upload the product information from the portable device to another electronic device, such as a set top box, and review the products scanned. From the set top box, the consumer may then purchase one or more of the various products and have them shipped to the consumer's address.

Figure 1:
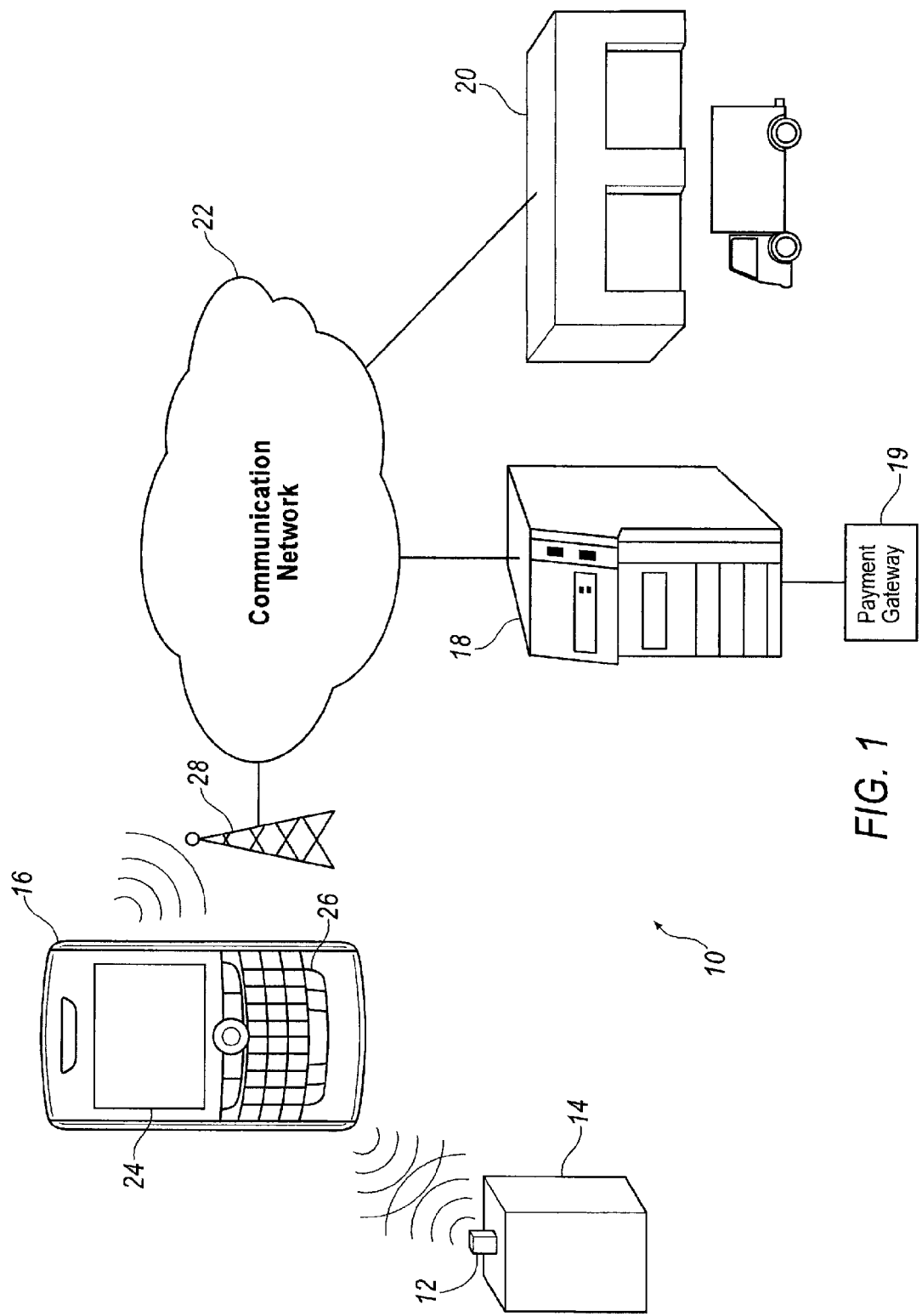
FIG. 1 is an exemplary diagram of a system having a portable device configured to receive product information and communicate with a vendor server.

FIG. 1 is a diagram of an exemplary system 10 that allows a user to research and/or purchase a product 14 using a portable device 16. In particular, the portable device 16 is configured to receive product information directly from product identifier 12 located on a product 14, for example, while the user is shopping at a store, and communicate order information, including the product information, the user's name, billing information, and possibly shipping information, to a vendor server 18 storing an electronic catalog of various products 14. The vendor server 18 may include a database stored on one or more computers that links the product information to each product 14 in the electronic catalog. This way, the user can research and/or purchase the product 14 from the portable device 16. In one exemplary approach, if the user does not want to carry or transport the product 12, the vendor server 18 may instead transmit the order to a shipper 20 to have the product 14 shipped to the user. The vendor server 18 may further include a payment gateway 19 for processing electronic payments so the user can take the product 12 immediately after purchase, or so the user can pay for the product 12 to be shipped. The portable device 16, vendor server 18, and shipper 20 may communicate via a communication network 22.

The user may view the product information on a display device 24 and input information into the portable device 16 using an interface device 26, such as a keyboard or keypad. The portable device 16 may be a cell phone, personal digital assistant (PDA), or any other device configured to communicate via the communication network 22. In one exemplary approach, the portable device 16 communicates with a cell phone tower 28 to access the communication network 22.

Figure 2:
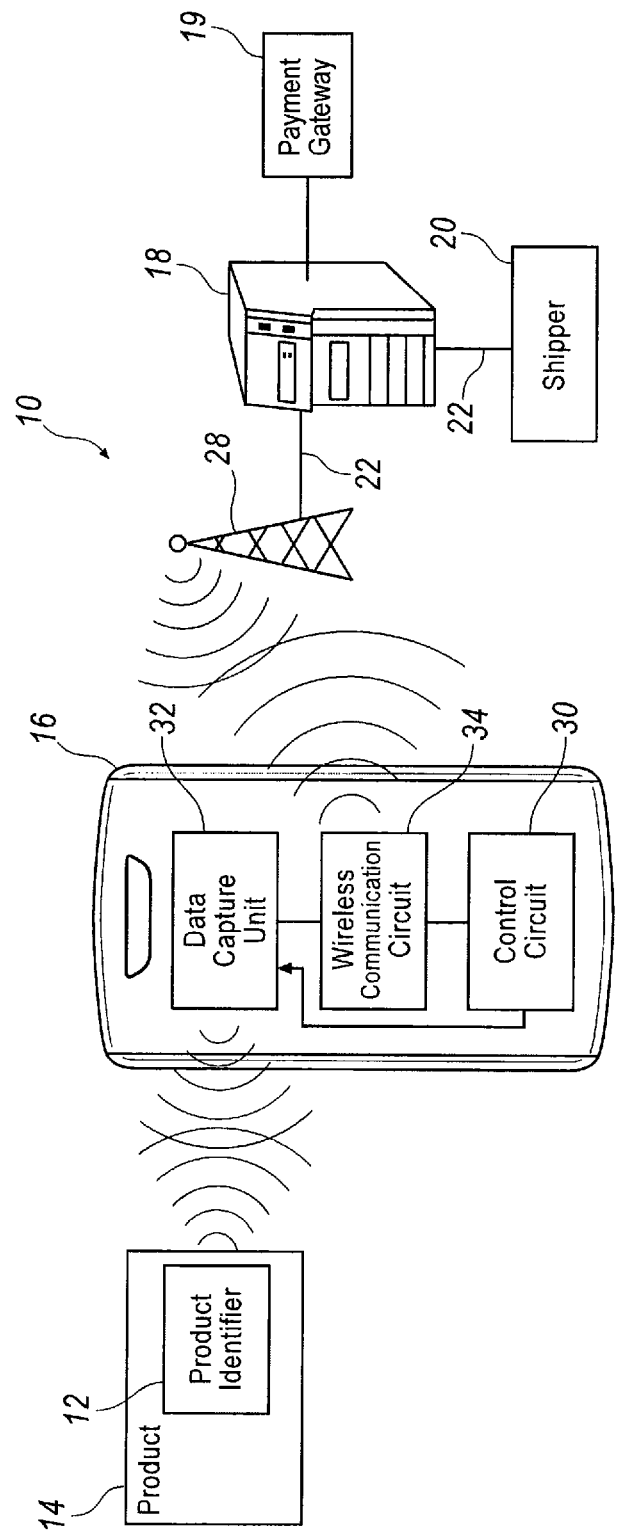
FIG. 2 is an exemplary diagram of the portable device having a data capture unit, a wireless communication circuit, and a control circuit.

Referring now to FIG. 2, the portable device 16 includes a control circuit 30 that controls a data capture unit 32 and a wireless communication circuit 34, as well as the general operation of the portable device 16. For example, in one exemplary approach, the portable device 16 is a cell phone and the control circuit 30 controls performs functions related to communicating over a wireless cellular network. In another exemplary approach, the portable device 16 is a PDA, and the control circuit 30 performs functions related to handheld computing. In other exemplary implementations, the control circuit 30 may be configured to perform other tasks related to other types of electronic devices.

The data capture unit 32 communicates with and receives the product information from the product identifier 12 disposed on or near a product 14 at, for example, a store. In one exemplary implementation, the product identifier 12 may include a barcode representing the product information that identifies the product 14 or, in another exemplary implementation, a radio frequency identification (RFID) tag that broadcasts the product information using a radio frequency signal. Accordingly, the data capture unit 32 may include a barcode scanner or radio frequency (RF) receiver configured to receive the product information from the product identifier 12. These implementations are merely exemplary and the data capture unit 32 may include other devices capable of communicating with the product identifier 12. The control circuit 30 may further be configured to convert the product information into order information. In one exemplary approach, the control circuit 30 accesses a memory storage device (not shown) that includes the user's name, billing information, and shipping information. The control circuit 30 may combine this information with the product information to generate the order information. Then, the order information may be transmitted to the vendor server 18 to order the product 14.

The wireless communication circuit 34 is configured to communicate with the vendor server 18 over the communication network 22. In particular, the control circuit 30 directs the product information and/or order information to the wireless communication circuit 34 so that it can be communicated to the vendor server 18. Using the communication network 22, the wireless communication circuit 34 transmits the product information to the vendor server 18. In response, the vendor server 18 may send additional information to the portable device 16. The additional information may include specifications, reviews, accessories, or other information that may help the user determine whether to purchase the product 14. The additional information is received by the wireless communication circuit 34 and may be displayed on the display device 24 (see FIG. 1). The display device 24 may be in communication with the control circuit 30 and configured to display the product information received from the product identifier 12, additional product information received from the vendor server 18, and the order information. In one exemplary approach, the display device 24 includes a liquid crystal display (LCD) screen. If the order information is transmitted to the vendor server 18, the vendor server 18 may request the user to verify the order information. The user may view the order information on the display device 24, and use the interface device 26 (see FIG. 1) to verify the order. The interface device 26 is in communication with the control circuit 30 and allows the user to interact with the portable device 16. In one exemplary approach, the interface device 26 is a keypad of a cell phone. In another exemplary approach, the interface device 26 is a keyboard. Alternatively, the interface device 26 may be combined with the display device 24, such as a touch screen. With the interface device 26, the user is able to scroll through product information, input order information, and communicate with the vendor server 18, for example, to verify the order information, among others. Once verified, the vendor server 18 forwards the order information to the shipper 20, and the shipper 20 ships the product 14 to the user.

In another exemplary approach, the data capture unit 32 may be configured to receive product information from a plurality of products 14. For example, as the user walks through a store, the user may be able to receive product information from more than one product identifier 12, and store the product information for each product 14 in the portable device 16. Then, the user may view the product information for each of the products 14 simultaneously, sequentially, or otherwise, on the portable device 16. When the portable device 16 receives product information from multiple products 14, the control circuit 30 may be configured to prioritize the product information and generate order information for one or more of the products 14 collectively or separately so that products 14 with a higher priority will be ordered before products 14 with a lower priority.

In one exemplary approach, the user may use the interface device 26 to assign a priority to each of the products 14. For example, the user may designate the product information for one or more products 14 as "purchase now" priority, product information for other products 14 as "purchase later" priority, and product information for yet another group of products 14 may be given a "delete" designation. Once designated, the product information may be organized via software into different folders in the memory storage device. For example, the product information designated "purchase now" may be placed in a "purchase now" folder, while the product information designated "purchase later" may be placed in a "purchase later" folder. The product information designated "delete" may simply be deleted from the portable device 16 instead of being placed into a folder. The product information stored in the "purchase now" folder may be ordered immediately upon verification from the user, while the product information designated "purchase later" may remain the memory device until designated with "purchase now" priority and/or placed in the "purchase now" folder.

Alternatively, the control circuit 30 may assign priority automatically using any criteria, such as the time the product information was received or the cost of the product 14. For example, once authorized by the user, the products 14 may be ordered from the vendor server 18 based on the order in which the product information was obtained.

Regardless how priority is determined, the control circuit 30 may generate order information for each of the products 14 and transmit the order information to the vendor server 18 based on the designated priority. Accordingly, products 14 with the higher priority designation will be ordered before products 14 of the lower priority.

Figure 3:
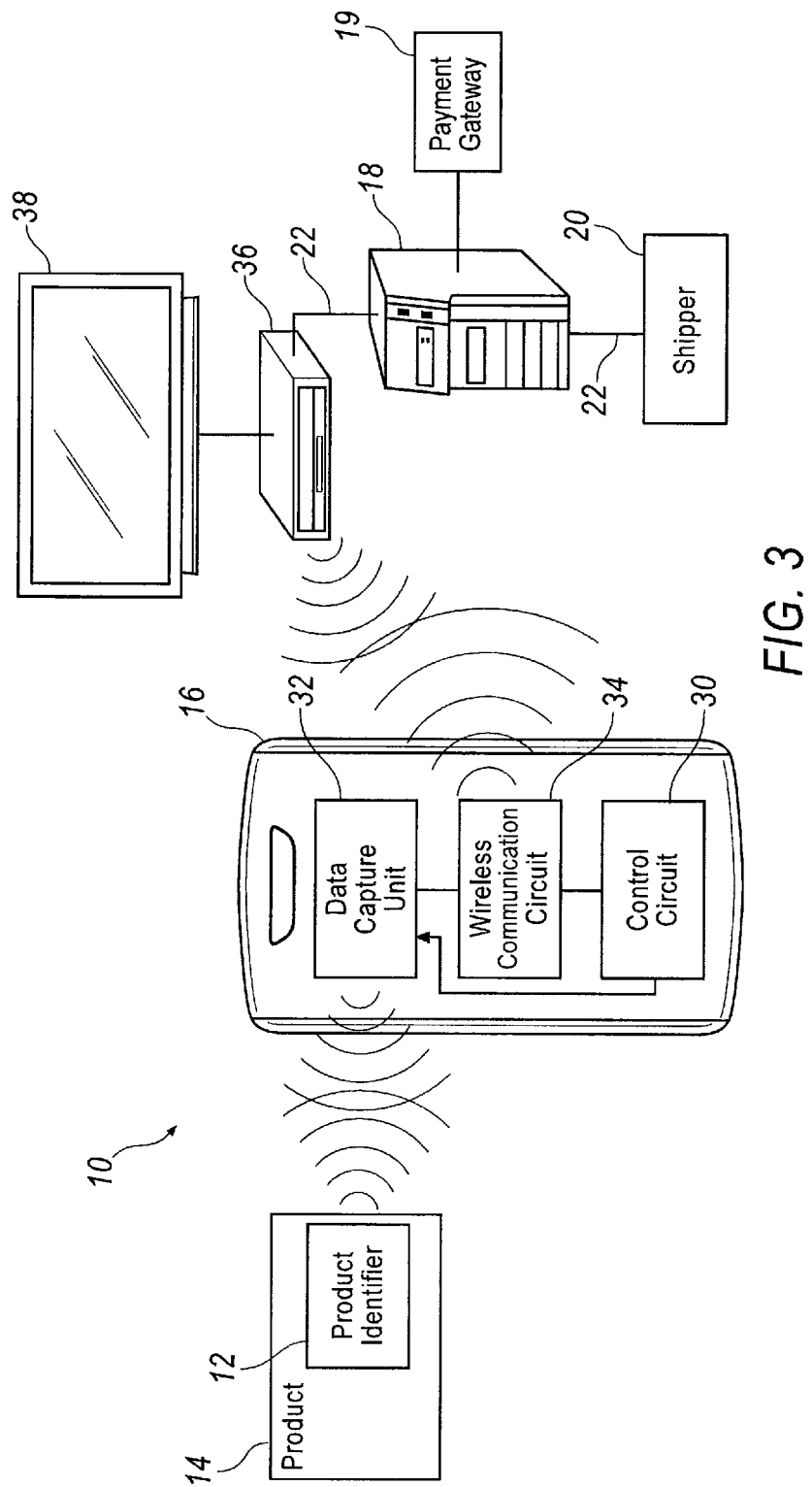
FIG. 3 is an exemplary diagram of the portable device in communication with a set top box.

Referring now to FIG. 3, the portable device 16 may communicate with another electronic device, such as a set top box 36. Specifically, the wireless communication circuit 34 may be configured to communicate the product information to the set top box 36 via Bluetooth®, WiFi, Zigbee, or any other network or communication protocol. The user may use the portable device 16 to further interface with the set top box 36, or alternatively, a remote control (not shown). The set top box 36 may further be configured to communicate with the vendor server 18 via the communication network 22 to transmit the product information and/or order information to the vendor server 18 and receive additional product information sent from the vendor server 18. Moreover, the set top box 36 may be configured to convert the product information into order information by combining the product information with the user's name, billing information, and shipping information stored in a memory storage device (not shown) within or accessible to the set top box 36. The set top box 36 may output the product information, the additional product information, and/or the order information to a display screen 38 such as a television for review and/or verification of the information by the user.

Figure 4:
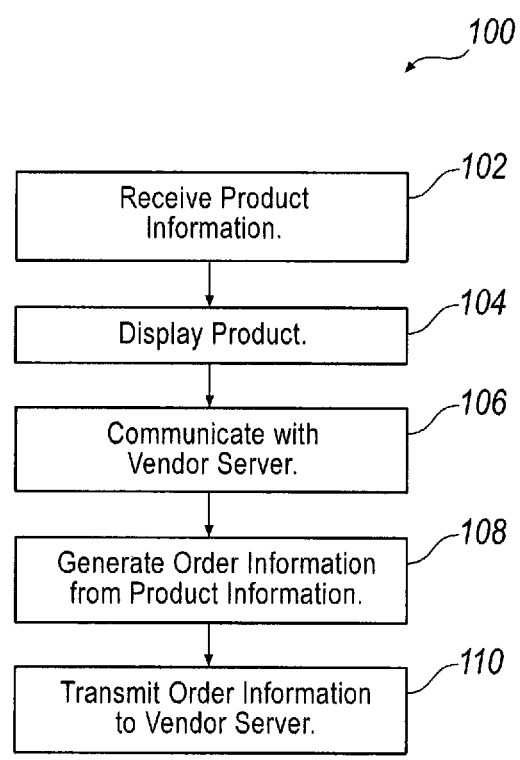
FIG. 4 is a flowchart illustrating an exemplary method executed by various components of the system.

FIG. 4 is a flowchart illustrating an exemplary method 100 executed by various components of the system 10. The method 100 includes a step 102 of receiving product information at the portable device 16, which may include scanning the barcode 12 disposed on the product 14, or receiving a radio frequency signal communicating the product information. The method 100 may further include a step 104 of displaying the product 14 associated with the product information on the portable device 16 or on the set top box 36, and a step 106 of communicating with the vendor server 18 storing an electronic catalog that includes the product 14 associated with the product information. Order information is generated from the product information at step 108, and the order information is transmitted to the vendor server 18 from either the portable device 16 or the set top box 36 in step 110. As previously discussed, communication between the portable device 16, the vendor server 18, and the set top box 36 may be via the communication network 22.

The portable device 16 may be a computing device that generally includes applications, which may be software applications tangibly embodied as a set of computer-executable instructions on a computer readable medium within a computing device. The computing device may be any one of a number of computing devices, such as a personal computer, handheld computing device, cellular telephone, embedded microprocessor, etc.

Computing devices may employ any of a number of computer operating systems, including, but not limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Computing devices generally each include instructions executable by one or more devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

The system 10 may include a variety of hardware and/or software, including the portable device 16, the vendor server 18, and the set top box 36. For example, the system 10 may include one or more computer servers, such as the vendor server 18, associated with a regional data store management system (RDBMS) from which data may be extracted. However, the system 10 may also represent other mechanisms for providing data, such as data stored in one or more files and obtained via file transfer protocol (FTP) or the like, data obtained from a computer-readable medium such as a disk or tape, or even manual entry of data, among other possible mechanisms. The precise number and type of computer servers included in the system 10 is not crucial. Further, it is not crucial that any of the information be stored in any particular data store. Thus, the system 10 may be configured to a variety of architectures.

Data stores may be associated with various computing devices and may include a relational database management system (RDBMS). An RDBMS generally employs Structured Query Language (SQL) in addition to a language for creating, storing, editing, and executing stored procedures, such as the PL/SQL language mentioned above. However, it is to be understood that data stores associated with a computing device may be some other kind of database such as a hierarchical database, a set of files, and an application database in a proprietary format, etc. A data store often includes a computing device employing a computer operating system such as one of those mentioned above, and are accessed via a network in any one or more of a variety of manners, as is well known.

Any method steps described herein may be generally tangibly embodied as one or more sets of computer-executable instructions stored on a computer-readable medium. Such computer readable-medium may be included in or associated with one or more computing devices, even if such devices are not illustrated in the Figures. The method steps accordingly generally execute within one or more such computing devices.

A computer-readable medium includes any medium, including a tangible medium, which participates in providing data (e.g., instructions), which may be read by a computer. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of tangible computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. The tangible computer-readable medium may include instructions for performing any of the steps previously recited. However, it is to be appreciated that the tangible computer-readable medium may include instructions for performing steps other than those recited. It is to be further appreciated that some of steps may be performed by the computer, whereas other steps may be performed by a person or another computer.

Transmission media may include coaxial cables, copper wire, and fiber optics, including the wires that comprise a system bus coupled to a processor. Transmission media may include or convey acoustic waves, light waves and electromagnetic emissions, such as those generated during radio frequency (RF) and infrared (IR) data communications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, the above description is intended to be illustrative and not restrictive. Many systems and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the invention is capable of modification and variation and is limited only by the following claims.

All terms used in the claims are intended to be given their broadest reasonable constructions and their ordinary meanings unless an explicit indication to the contrary in made herein. In particular, use of the singular articles such as "a," "the," "said," etc. should be read to recite one or more of the indicated elements unless a claim recites explicitly to the contrary.

I claim:

1. A portable device comprising:
   a control circuit;
   a data capture unit in communication with said control circuit and configured to receive instances of product information from respective product identifiers of a plurality of products for sale at a physical premises of a vendor, wherein said control circuit is configured to assign a priority to each of the instances of product information received, options for the assigned priority including a purchase-now priority and a purchase-later priority; and
   a wireless communication circuit in communication with said control circuit and said data capture unit, and wherein said wireless communication circuit is configured to transmit, in accordance with the assigned priority, said product information to a vendor server storing an electronic catalog that includes information associated with the plurality of products, wherein the control circuit is configured to generate a purchase request for each instance of product information assigned a purchase-now priority but not for those instances of product information assigned a purchase-later priority and the wireless communication circuit is configured to transmit the purchase requests to the vendor, the purchase requests being configured to allow purchase of the ones of the plurality of products associated with the purchase requests from the vendor and immediate removal of the ones of the plurality of products associated with the purchase requests from the physical premises.

2. A portable device as set forth in claim 1, wherein said data capture unit includes a radio frequency receiver.

3. A portable device as set forth in claim 2, wherein said radio frequency receiver is configured to receive a radio frequency signal broadcasting the product information.

4. A portable device as set forth in claim 2, wherein the radio frequency signals are broadcast by a radio frequency identification tag.

5. A portable device as set forth in claim 1, wherein said data capture unit includes a barcode scanner.

6. A portable device as set forth in claim 5, wherein said barcode scanner is configured to read a barcode representing the product information.

7. A portable device as set forth in claim 1, further comprising a display device in communication with said control circuit and configured to display the product information.

8. A portable device as set forth in claim 7, wherein said wireless communication circuit is configured to receive additional product information, and wherein said control circuit is configured to display the additional product information on said display device.

9. A portable device as set forth in claim 1, further comprising an interface device in communication with said control circuit.

10. A portable device as set forth in claim 1, wherein said wireless communication circuit is configured to transmit the order information to the vendor server via a communication network.

11. A portable device as set forth in claim 10, wherein the vendor server includes a payment gateway.

12. A portable device as set forth in claim 1, wherein said wireless communication circuit is configured to communicate with a set top box in communication with a communication network.

13. A portable device as set forth in claim 12, wherein the set top box is configured to transmit order information to the vendor server via the communication network.

14. A portable device as set forth in claim 13, wherein the vendor server includes a payment gateway.

15. A method comprising:
  receiving at a portable device instances of product information from respective product identifiers of a plurality of products for sale at a physical premises of a vendor;
  displaying images associated with the instances of product information on the portable device;
  assigning a priority to each instance of the product information received, options for the assigned priority including a purchase-now priority and a purchase-later priority;
  transmitting, in accordance with the assigned priority, the product information to a vendor server storing an electronic catalog that includes information associated with the plurality of products;
  generating a purchase request for each instance of product information assigned a purchase-now priority but not for those instances of product information assigned a purchase-later priority; and
  transmitting the purchase requests to the vendor, the purchase requests being configured to allow purchase of the ones of the plurality of products associated with the purchase requests from the vendor and immediate removal of the ones of the plurality of products associated with the purchase requests from the physical premises.

16. A method as set forth in claim 15, wherein receiving the product information includes scanning a barcode disposed on a product.

17. A method as set forth in claim 15, wherein receiving the product information includes receiving a radio frequency signal communicating the product information.

18. A method as set forth in claim 15, further comprising displaying images associated with the product information on a set top box.

19. A method as set forth in claim 18, further comprising;
  generating order information from the product information; and
  transmitting the order information to the vendor server from the set top box using a communication network.

20. A method as set forth in claim 15, wherein transmitting the product information to the vendor server includes transmitting the product information from the portable device to the vendor server using a communication network.

* * * * *